US012663110B2

(12) United States Patent
Chay et al.

(10) Patent No.: US 12,663,110 B2
(45) Date of Patent: Jun. 23, 2026

(54) MAGNETIC COUPLING MECHANISM FOR FLUID CONDUITS

(71) Applicant: LIONSBOT INTERNATIONAL PTE. LTD., Singapore (SG)

(72) Inventors: Wai Peng Benjamin Chay, Singapore (SG); Tushar Mohan, Singapore (SG); Mohan Rajesh Elara, Singapore (SG); Dylan Terntzer Ng, Singapore (SG)

(73) Assignee: LIONSBOT INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 19/118,359

(22) PCT Filed: Sep. 29, 2023

(86) PCT No.: PCT/SG2023/050649
§ 371 (c)(1),
(2) Date: Apr. 4, 2025

(87) PCT Pub. No.: WO2024/076294
PCT Pub. Date: Apr. 11, 2024

(65) Prior Publication Data
US 2026/0117905 A1 Apr. 30, 2026

(30) Foreign Application Priority Data
Oct. 4, 2022 (SG) ............................ 10202251252A

(51) Int. Cl.
*F16L 37/252* (2006.01)
*F16L 37/00* (2006.01)
(52) U.S. Cl.
CPC ........... *F16L 37/004* (2013.01); *F16L 37/252* (2013.01)

(58) Field of Classification Search
CPC ..... F16L 37/004; F16L 37/248; F16L 37/252; F16L 37/24; F16L 2201/10
See application file for complete search history.

(56) References Cited

U.S. PATENT DOCUMENTS

| | | | |
|---|---|---|---|
| 4,260,180 A | * | 4/1981 | Halushka ............ F16L 37/2445 285/391 |
| 5,645,302 A | * | 7/1997 | Horimoto ............... F16L 25/01 285/70 |

(Continued)

FOREIGN PATENT DOCUMENTS

CN      111076008 A      4/2020

OTHER PUBLICATIONS

International Search Report and Written Opinion of International Searching Authority with mailing date of Feb. 23, 2024 for International Application No. PCT/SG2023/050649.

(Continued)

*Primary Examiner* — Aaron M Dunwoody
(74) *Attorney, Agent, or Firm* — JCIP; Joseph G. Chu

(57) ABSTRACT

A magnetic coupling mechanism (1) for a fluid conduit comprising: a female part (3) having an internal cavity (7) with an inlet opening (9) and an opposing outlet opening (19); a male part (5) having a coupling section (11) insertable through the inlet opening of the female part for coupling with the internal cavity thereof, and an engagement section (13) for engaging with a fluid conduit, a coupling arrangement provided between the internal cavity of the female part and the coupling section of the male part, the coupling arrangement including at least one engagement lug (23) extending from the coupling section, and at least one cooperating channel (25) provided within an inner wall of the internal cavity, the or each said cooperating channel accommodating an associated said engagement lug when the coupling section is rotated relative to the internal cavity once (Continued)

accommodated therein to a coupling position to thereby prevent extraction of the coupling section from the internal cavity; wherein the coupling section is urged for rotation to the coupling position during use by a magnetic assembly including at least one first magnet (29) mounted on the coupling section, and at least one second magnet (31) mounted within the internal cavity.

8 Claims, 3 Drawing Sheets

(56) References Cited

U.S. PATENT DOCUMENTS

| | | | | |
|---|---|---|---|---|
| 9,796,014 | B2 * | 10/2017 | Weyland | B23B 31/06 |
| 10,408,435 | B1 * | 9/2019 | Lee | F16B 7/20 |
| 11,384,890 | B1 | 7/2022 | Herrick | |
| 11,460,137 | B2 * | 10/2022 | Vinson | F16L 37/252 |

| | | | | |
|---|---|---|---|---|
| 2006/0219305 | A1 * | 10/2006 | Bordonaro | F15B 13/0817 |
| | | | | 137/625.65 |
| 2011/0084474 | A1 | 4/2011 | Paden et al. | |
| 2013/0303000 | A1 * | 11/2013 | Witter | F16L 37/004 |
| | | | | 403/324 |
| 2014/0311579 | A1 * | 10/2014 | Nanaji | F16L 55/1015 |
| | | | | 137/2 |
| 2015/0052720 | A1 * | 2/2015 | Weyland | B21J 15/36 |
| | | | | 403/349 |
| 2016/0229680 | A1 * | 8/2016 | Cornett | F16L 55/1015 |
| 2017/0057420 | A1 * | 3/2017 | Fiedler | F16M 11/16 |
| 2020/0292114 | A1 * | 9/2020 | Liu | F16M 13/022 |
| 2025/0003542 | A1 * | 1/2025 | Coleiro | F16L 59/065 |

OTHER PUBLICATIONS

International Preliminary Report on Patentability with completion date Aug. 30, 2024 for International Application No. PCT/SG2023/050649.

* cited by examiner

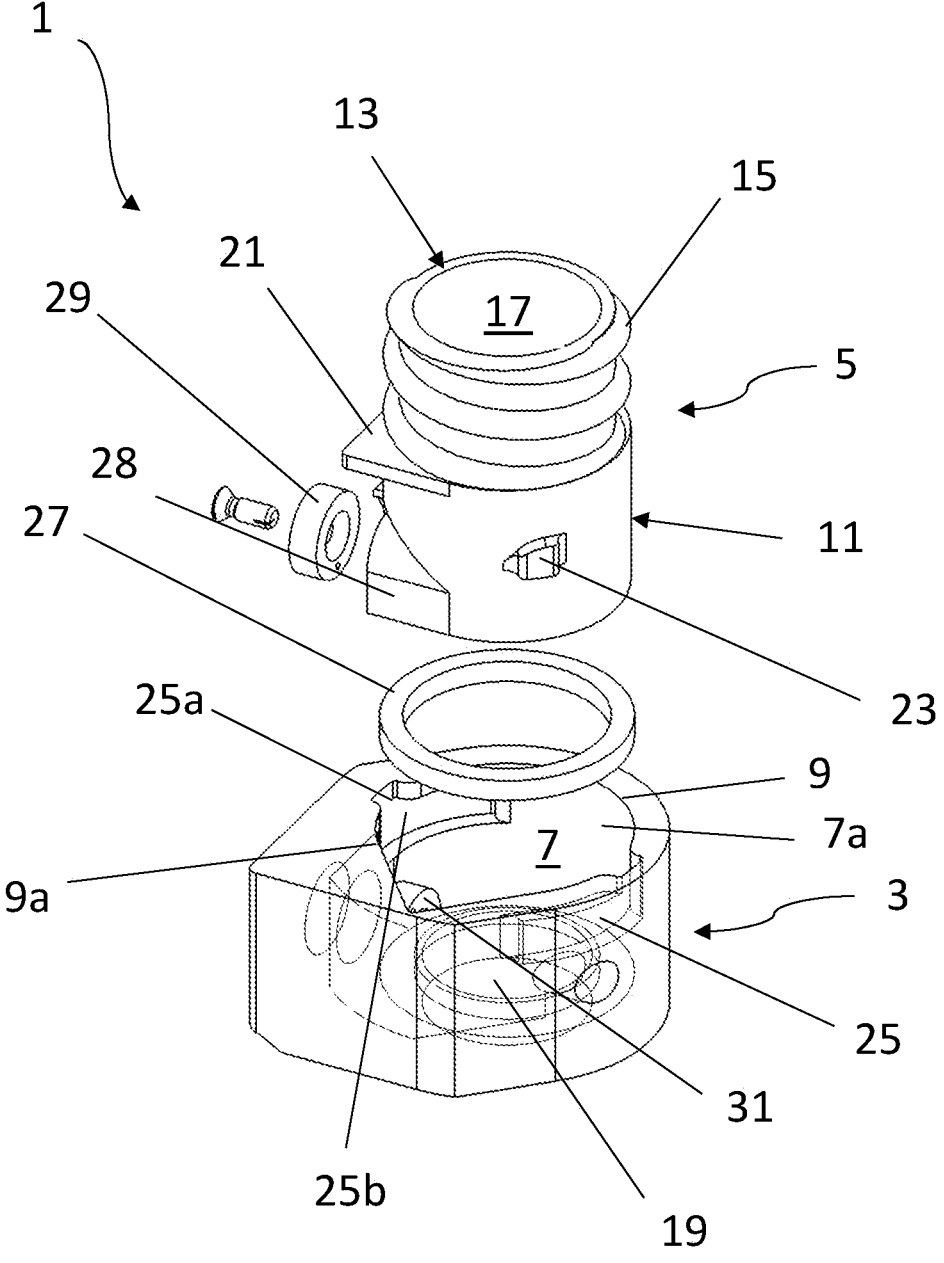
[Fig. 1]

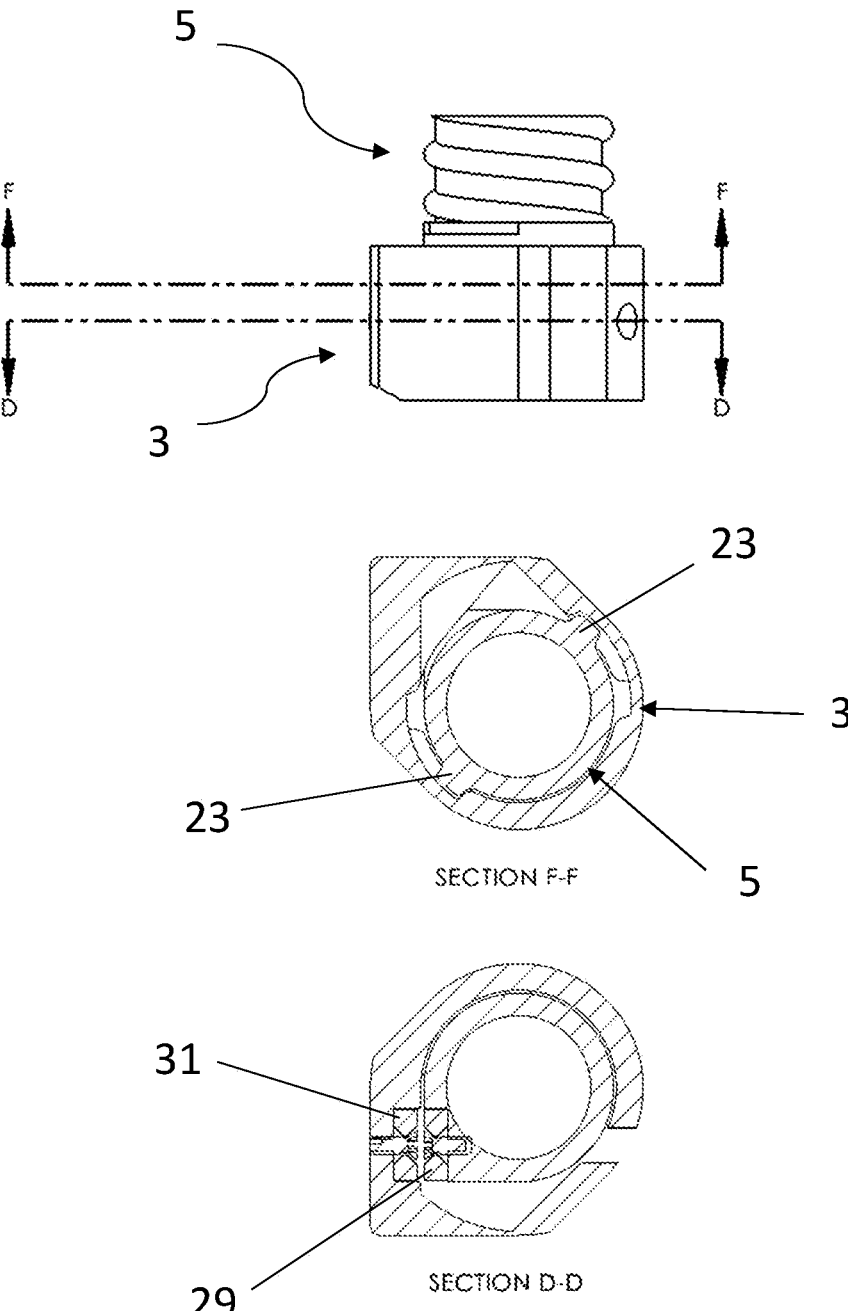
SECTION F-F
SECTION D-D
[Fig. 2]

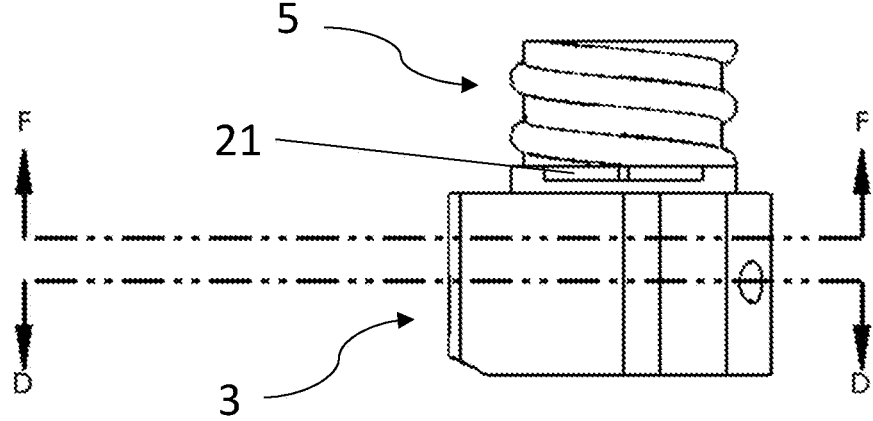
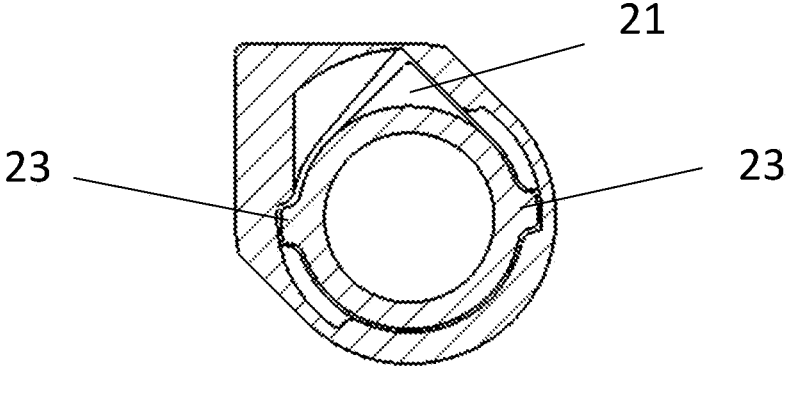
SECTION F-F
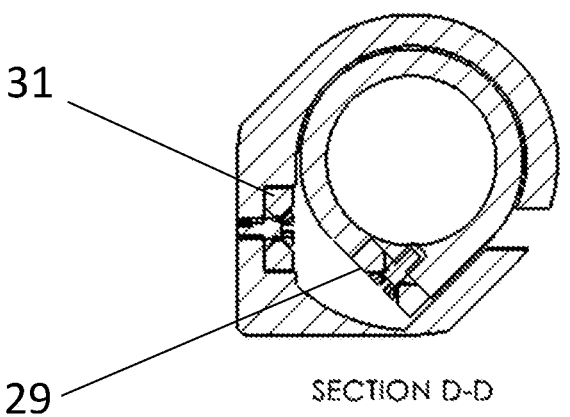
SECTION D-D
[Fig. 3]

MAGNETIC COUPLING MECHANISM FOR FLUID CONDUITS

FIELD

The present invention relates to a magnetic coupling mechanism for fluid conduits. While the magnetic coupling mechanism according to the present invention will be described with reference to its use for vacuum cleaner fluid conduits, it is to be appreciated that the present invention is not restricted to this application, and that other applications are also envisaged.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Many different types of coupling arrangements have been used to couple fluid conduits to other components. A simple coupling arrangement that uses moving parts is a hose clip that requires a screw to be turned to tighten the coupling. Other coupling arrangements include the so called 'quick connect' types that typically incorporate a latching mechanism together with a seal to allow for rapid coupling and decoupling of a fluid conduit. There are also coupling arrangements which have no moving parts and typically require the fluid conduit to be stretched over a male connector. Such coupling arrangements are however difficult to couple or decouple as it typically requires that the fluid conduit be stretched over the male connector. Also, such coupling arrangements having no moving parts typically require tight tolerances of the connector and fluid conduit to ensure consistent fitting of the parts.

Conventional hose coupling mechanisms generally have moving parts like a latch or a clip that holds the male and female parts together. This means that any poor tolerancing of the manufactured parts can potentially lead to the parts not fitting together well resulting in fluid leaks at the coupling area. Furthermore, the use of moving parts such as a clip or latching design is prone to wear and tear over time potentially resulting in the clip or latch breaking or wearing out because of frequent use.

An object of the invention is to ameliorate one or more of the above-mentioned difficulties.

SUMMARY

According to an aspect of the present disclosure, there is provided a magnetic coupling mechanism for a fluid conduit comprising:
- a female part having an internal cavity with an inlet opening and an opposing outlet opening;
- a male part having a coupling section insertable through the inlet opening of the female part for coupling with the internal cavity thereof, and an engagement section for engaging with a fluid conduit,
- a coupling arrangement provided between the internal cavity of the female part and the coupling section of the male part, the coupling arrangement including at least one engagement lug extending from the coupling section, and at least one cooperating channel provided within an inner wall of the internal cavity, the or each said cooperating channel accommodating an associated said engagement lug when the coupling section is rotated relative to the internal cavity once accommodated therein to a coupling position to thereby prevent extraction of the coupling section from the internal cavity;
wherein the coupling section is urged for rotation to the coupling position during use by a magnetic assembly including at least one first magnet mounted on the coupling section, and at least one second magnet mounted within the internal cavity.

In some embodiments, the or each cooperating channel is generally 'L' shaped to thereby provide an entrance portion through with the associated engagement lug can be inserted, and an undercut portion connected to the entrance portion for accommodating the engagement lug once the coupling portion is rotated within the internal cavity of the female part.

In some embodiments, a pair of said engagement lugs are provided on opposing sides of the coupling section, for cooperating with a pair of said cooperating channels.

In some embodiments, the magnetic assembly comprises the at least one first magnet mounted on a mount block extending generally laterally from the coupling section and supporting the first magnet at an angle away from the coupling section, and the at least one second magnet mounted within an inner wall of the interior cavity.

In some embodiments, the male part comprises at least one visual alignment tab extending generally laterally from the male part, and aligning with a corresponding peripheral portion of the inlet opening of the female part when the male part is at a decoupled position corresponding to a predetermined rotational orientation relative to the female part.

In some embodiments, the mount block supporting the at least one first magnet is generally aligned with the alignment tab on the coupling section.

In some embodiments, the first and second magnets are positioned in a closely adjacent or abutting position when the male part is in the coupling position relative to the female part.

In some embodiments, the magnetic coupling mechanism further comprises a gasket provided with the internal cavity surrounding the outlet opening to thereby provide a seal between the male part and the female part once coupled.

In some embodiments, the engagement section comprises an external thread for engaging with a said fluid conduit.

Other aspects and features will become apparent to those of ordinary skill in the art upon review of the following description of specific embodiments in conjunction with the accompanying figures.

BRIEF DESCRIPTION OF THE DRAWINGS

In the figures, which illustrate, by way of example only, embodiments of the present invention, FIG. 1 is a partially phantom exploded perspective view of a magnetic coupling mechanism according to the present disclosure;

FIG. 2 respectively shows a side view and sectional views taken along section F-F and D-D respectively of the side view of the magnetic coupling mechanism of FIG. 1 when in a coupled position; and FIG. 3 respectively shows a side view and sectional views taken along section F-F and D-D respectively of the side view of the magnetic coupling mechanism of FIG. 1 when in a decoupled position.

Other arrangements of the invention are possible and, consequently, the accompanying drawings are not to be understood as superseding the generality of the preceding description of the invention.

DETAILED DESCRIPTION

Throughout this document, unless otherwise indicated to the contrary, the terms "comprising", "consisting of", "having" and the like, are to be construed as non-exhaustive, or in other words, as meaning "including, but not limited to".

Furthermore, throughout the specification, unless the context requires otherwise, the word "include" or variations such as "includes" or "including" will be understood to imply the inclusion of a stated integer or group of integers but not the exclusion of any other integer or group of integers.

Example embodiments of the present invention will now be described with reference to the accompanying drawings. The terminology used herein is for the purpose of describing particular embodiments only and is not intended to limit the scope of the present invention. Other definitions for selected terms used herein may be found within the detailed description of the invention and apply throughout the description. Additionally, unless defined otherwise, all technical and scientific terms used herein have the same meanings as commonly understood by one or ordinary skill in the art to which this invention belongs. Where possible, the same reference numerals are used throughout the figures for clarity and consistency.

Referring to FIGS. 1 to 3, there is shown an exploded perspective view of a coupling mechanism 1 according to the present disclosure. The coupling mechanism 1 comprises a female part 3 and a male part 5. The female part 3 is provided with an internal cavity 7 having an inlet opening 9 through which the male part 5 can be inserted. The male part 5 comprises a coupling section 11 that can be inserted into the female part internal cavity 7, and an engagement section 13 for engaging a fluid conduit such as for example a vacuum cleaner hose or a water line (not shown). The engagement section 13 is shown having an external thread 15 that can engage a cooperating threaded bore of a connector provided at an end of the fluid conduit. The use of alternative engagement means for joining the engagement section 13 to a fluid conduit is also envisaged. The male part 5 is provided with a bore 17 extending through the male part 15. The bore 17 may be aligned with an outlet opening 19 provided at the opposing end to the inlet opening 9 of the female part 3. The bore 17 and outlet opening 19 are shown as having a circular cross-section in FIG. 1.

The male part 5 further includes a visual alignment tab 21 shown as a pointed tag extending generally laterally from the male part 5 in FIG. 1. This alignment tab 21 is aligned with a corresponding point shaped peripheral portion 9a of the inlet opening 9 when the male part 5 is to be inserted into the female part 3. This ensures that the male part 5 is inserted within the female part cavity 7 when it is at a decoupled position corresponding to a predetermined rotational orientation relative to the female part 3. A coupling arrangement is further provided to allow for coupling of the coupling section 11 and the internal cavity 7. The coupling arrangement comprises at least one engagement lug 23 extending generally laterally from the coupling section 11. In the embodiment shown in FIG. 1, two such engagement lugs 23 extending from opposing sides of the coupling section 11 are provided. The coupling arrangement further includes at least one cooperating channel 25 provided within the inner wall 7a of the female part internal cavity 7. The channel 25 is generally 'L' shaped, and include an entrance portion 25a through which the male part engagement lug 23 can be inserted when the male part 5 is in the above noted predetermined rotational orientation. The channel 25 further includes an undercut portion 25b connected to the entrance portion 25a for accommodating the associated engagement lug 23 when the male part 5 is rotated once the coupling section 11 is located within the cavity 7. In the illustrated embodiment, two cooperating channels 25 are provided to respectively accommodate each engagement lug 23. In the embodiment as shown in FIGS. 1 to 3, the male part 5 is rotated clockwise relative to the female part 3 into the coupling position as shown in FIG. 2. This then result in engagement of the male part 5 with the female part 3 preventing extraction of the male part 5 therefrom. A gasket 27 is located within the cavity 7 surrounding the outlet opening 19 to assist in providing a seal between the male part 5 and female part 3 once the male part 5 is located within and coupling with the female part 3.

In the magnetic coupling assembly 1 according to the present disclosure, a magnetic arrangement is used to rotate the male part 5 into the coupling position. A first magnet 29 is supported a mount block 28 extending generally laterally from the coupling section 11, and supporting the first magnet 29 at an angle away from the coupling section 11. A second magnet 31 is provided within an inner wall 7a of the female part cavity 7. An attractive magnetic force between the first and second magnets 29,31 acts to urge the male part 5 to rotate clockwise from the decoupled position shown in FIG. 3 into the coupling position as shown in FIG. 2. The angular support of the first magnet 29 helps to ensure that the first magnet 29 is positioned in a parallel adjacent or abutting relationship with the second magnet 31 once the coupling section 11 is rotated into the coupling position shown in FIG. 2. Prior to coupling and following decoupling of the male part 5 from the female part 3, the male part 5 is in the decoupled position as shown in FIG. 3. Furthermore, the mount block 28 is generally aligned with the alignment tab 21 on the coupling section 11. This will ensure that the coupling section 11 will only pass through the inlet opening 9 into the internal cavity 7 when the alignment tab 21, and therefore the mount block 28, is aligned with the peripheral portion 9a of the inlet opening 9. This ensures that the magnet 29 is in the correct decoupled position when the male part 5 is initially inserted into the female part 3.

The magnetic coupling mechanism 1 according to the present disclosure has a number of advantages over existing mechanisms used to couple fluid conduits to another component as follows:

a) The manufacturing tolerances needs to produce the male part 5 and female part 3 do not need to be particularly high. It is envisaged that tolerances of around ±0.5 mm may still be acceptable, although this is dependent on the compressibility of the gasket 27.

b) There are no moving parts in either the male or female parts leading to little to no wear and tear on the components of the magnetic coupling mechanism;

c) The magnets are only used to rotate the male part relative to the female part, and are no otherwise used to retain in position the male part within the female part. This makes it more unlikely for the male part to accidently decouple from the female part.

d) The magnetic force provided by the attraction of the magnets can be tuned to vary the normal force applied to the gasket. A lower normal force is sufficient where the magnetic coupling mechanism is used to couple a vacuum suction hose to a vacuum cleaner, while a higher normal force may be required to allow for a water carrying conduit to be coupled using the magnetic coupling mechanism.

It should be appreciated by the person skilled in the art that the above invention is not limited to the embodiment described. It is to be appreciated that modifications and improvements may be made without departing from the scope of the present invention.

It should be further appreciated by the person skilled in the art that one or more of the above modifications or improvements, not being mutually exclusive, may be further combined to form yet further embodiments of the present invention.

The invention claimed is:

1. A magnetic coupling mechanism for a fluid conduit comprising:

a female part having an internal cavity with an inlet opening and an opposing outlet opening;

a male part having a coupling section insertable through the inlet opening of the female part for coupling with the internal cavity thereof, and an engagement section for engaging with a fluid conduit, a coupling arrangement provided between the internal cavity of the female part and the coupling section of the male part, the coupling arrangement including at least one engagement lug extending from the coupling section, and at least one cooperating channel provided within an inner wall of the internal cavity, the or each said cooperating channel accommodating an associated said engagement lug when the coupling section is rotated relative to the internal cavity once accommodated therein to a coupling position to thereby prevent extraction of the coupling section from the internal cavity;

wherein the coupling section is urged for rotation to the coupling position during use by a magnetic assembly including at least one first magnet mounted on the coupling section, and at least one second magnet mounted within the internal cavity; and wherein the male part comprises at least one visual alignment tab extending generally laterally from the male part, and aligning with a corresponding peripheral portion of the inlet opening of the female part when the male part is at a decoupled position corresponding to a predetermined rotational orientation relative to the female part.

2. A magnetic coupling mechanism according to claim 1, wherein the or each cooperating channel is generally 'L' shaped to thereby provide an entrance portion through with the associated engagement lug can be inserted, and an undercut portion connected to the entrance potion for accommodating the engagement lug once the coupling portion is rotated within the internal cavity of the female part.

3. A magnetic coupling mechanism according to claim 1, wherein a pair of said engagement lugs are provided on opposing sides of the coupling section, for cooperating with a pair of said cooperating channels.

4. A magnetic coupling mechanism according to claim 1, wherein the magnetic assembly comprises the at least one first magnet mounted on a mount block extending generally laterally from the coupling section and supporting the first magnet at an angle away from the coupling section, and the at least one second magnet mounted within an inner wall of the interior cavity.

5. A magnetic coupling mechanism according to claim 4, wherein the mount block supporting the at least one first magnet is generally aligned with the alignment tab on the coupling section.

6. A magnetic coupling mechanism according to claim 1, wherein the first and second magnets are positioned in a closely adjacent or abutting position when the male part is in the coupling position relative to the female part.

7. A magnetic coupling mechanism according to claim 1, further comprising a gasket provided with the internal cavity surrounding the outlet opening to thereby provide a seal between the male part and the female part once coupled.

8. A magnetic coupling mechanism according to claim 1, wherein the engagement section comprises an external thread for engaging with a said fluid conduit.

* * * * *